Jan. 19, 1926. 1,570,091
F. F. SMALL ET AL
LOCOMOTIVE AND VEHICLE DRIVE MECHANISM
Filed June 24, 1924 4 Sheets-Sheet 4

INVENTORS
Fred F. Small
BY Carl C. Nagel
Booth & Booth
ATTORNEYS

Patented Jan. 19, 1926.

1,570,091

UNITED STATES PATENT OFFICE.

FRED F. SMALL AND CARL E. NAGEL, OF OAKLAND, CALIFORNIA.

LOCOMOTIVE AND VEHICLE DRIVE MECHANISM.

Application filed June 24, 1924. Serial No. 722,056.

*To all whom it may concern:*

Be it known that we, FRED F. SMALL and CARL E. NAGEL, citizens of the United States, residing at Oakland, in the county of Alameda and State of California, have invented certain new and useful Improvements in Locomotive and Vehicle Drive Mechanisms, of which the following is a specification.

Our invention relates to drive mechanisms adaptable to locomotives and other power driven vehicles.

The primary object of our invention is to provide a drive mechanism by means of which internal combustion engines can be used successfully as the motive power for locomotives and rail cars. It should be understood distinctly, however, that our invention is not limited to such motive power, nor to railway work, but may be applied with equal success to other power driven vehicles such as the various forms of tractors and power driven road running vehicles, and may be used in connection with other types of motive power, such for example as electric motors or steam engines.

Another object of our invention is to provide a drive mechanism in which a plurality of motors or engines, and a plurality of driving wheels, are interconnected, so that the entire series of motors or engines operate in unison or in the proper synchronism, the functioning thereof being exactly comparable to that of a single motor or engine of equivalent power. By thus dividing the motive power equipment into a plurality of relatively small units or power driving members, we are able to position such members so advantageously in the truck or frame that, by a very simple construction, all the axles or wheels of the truck can be connected with the interconnected series of power driving members, thereby materially reducing the tendency to wheel slip common in that type of construction having independently driven wheels or axles. This interconnection between the several wheels or pairs of wheels, and their connection with the power driving members, is accomplished without the use of side rods, which are difficult to balance, and liable, in railway work, to produce deleterious pounding on the track.

The unit construction of the motive power equipment enables us to position the individual power driving members with their shafts cross-wise of the truck and to set them low in the truck frame. This permits the placing of the cab and the various necessary auxiliary apparatus, such for example as fuel and water tanks, air receivers, etc., directly over the truck, thereby concentrating all the weight on the drivers and reducing the total length; and in the case of rail cars, the entire motive power and driving mechanism can be positioned below the car floor.

In a locomotive or other vehicle embodying our invention, the entire weight can be spring borne with the exception of the wheels and axles. This is of material advantage in cutting down maintenance costs, both on the vehicles, and, in railway work, on the track.

As stated above, our invention is applicable to any locomotive, tractor, or other vehicle, whether rail or road moving, and to any type of motive power, but for purposes of illustration we have herewith illustrated it as embodied in a railway locomotive using internal combustion engines. It is to be understood, moreover, that the construction herewith illustrated and hereinafter described may be varied, within the limits of the claims hereto appended, without departing from the spirit of the invention or sacrificing the essential principles thereof.

With this in view, a preferred embodiment of our invention will now be fully described with reference to the accompanying drawings, wherein.

Figure 1:
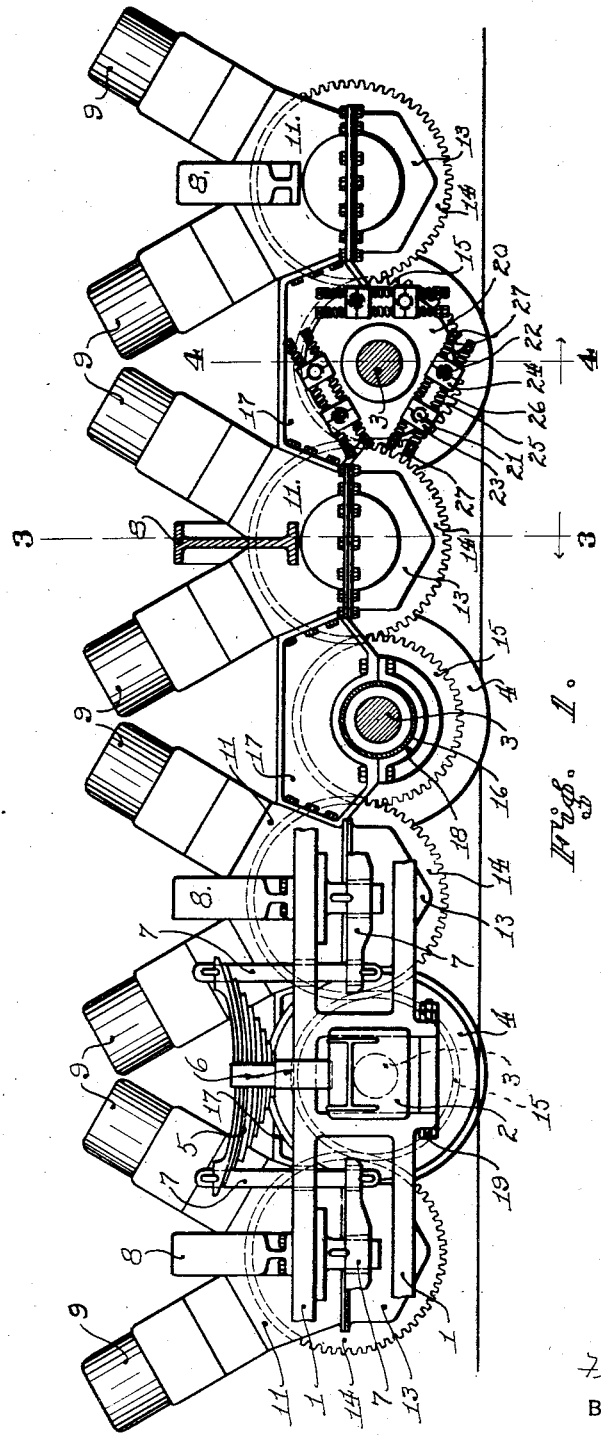
Fig. 1 is a part sectional side elevation of a locomotive truck embodying a preferred form of our invention.

In the drawings, the reference numeral 1 designates the side frame members of a truck in which are mounted, in the usual manner, the vertically movable boxes 2 journaled upon the ends of the axles 3 outside the wheels 4. The frame 1 is supported by springs 5, the centers of said springs being carried by the journal boxes 2 by means of brackets or posts 6, and their ends being connected with said frame through any well known system of links and equalizing levers indicated at 7 in Fig. 1. The frame 1 is provided with cross members 8, Figs. 1, 2 and 3, from which the motors or engines are rigidly suspended. In the drawing we have indicated such engines as internal combustion engines of the V-type, each having four cylinders 9 arranged in two pairs as shown, with the crank shaft 10, Figs. 2 and 3, disposed transversely of the truck. When such engines are used, it may be preferable to construct the cross members 8 integrally with the upper portions of the engine crank-cases 11, and to suspend the crank shaft journals 12 therefrom as shown in Fig. 3. With this construction, the lower portion 13 of the crank case serves only as an oil reservoir, and can be easily dropped to give access to the bearings. The pistons, connecting rods, valve gear, and other parts of the engines have been omitted from the drawings as forming no part of the present invention.

Figure 2:
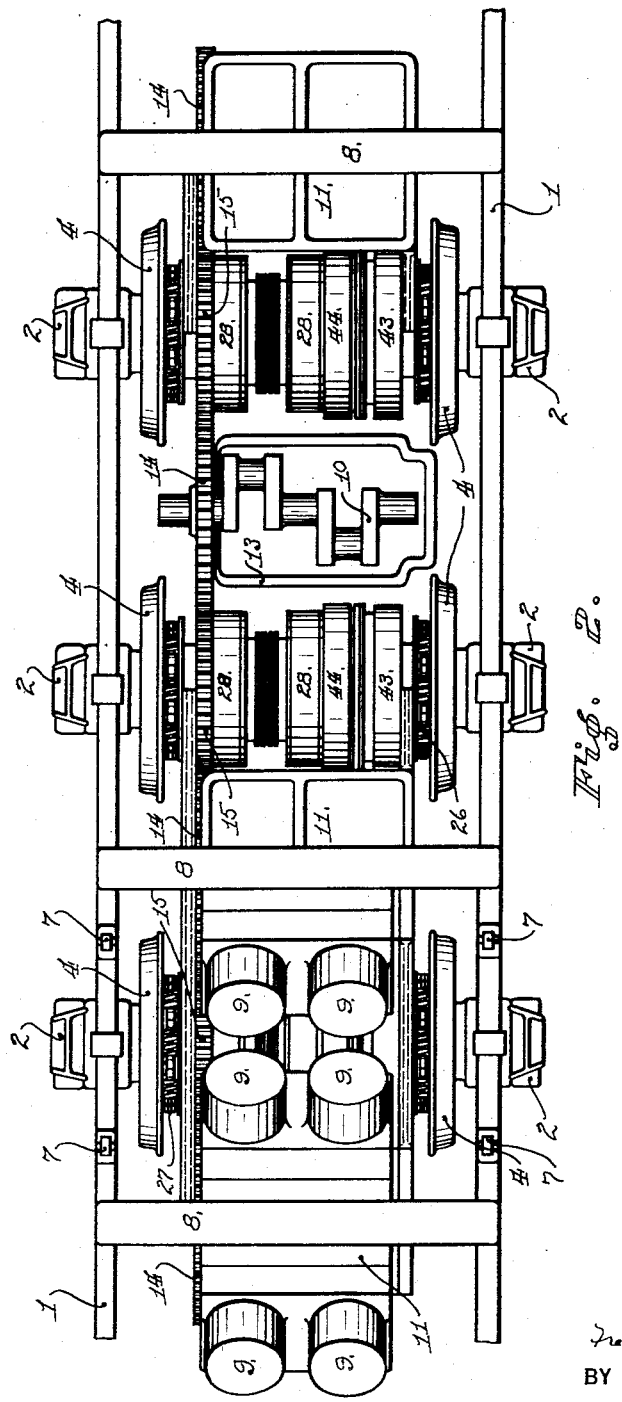
Fig. 2 is a part sectional plan view of the same.
Figure 3:
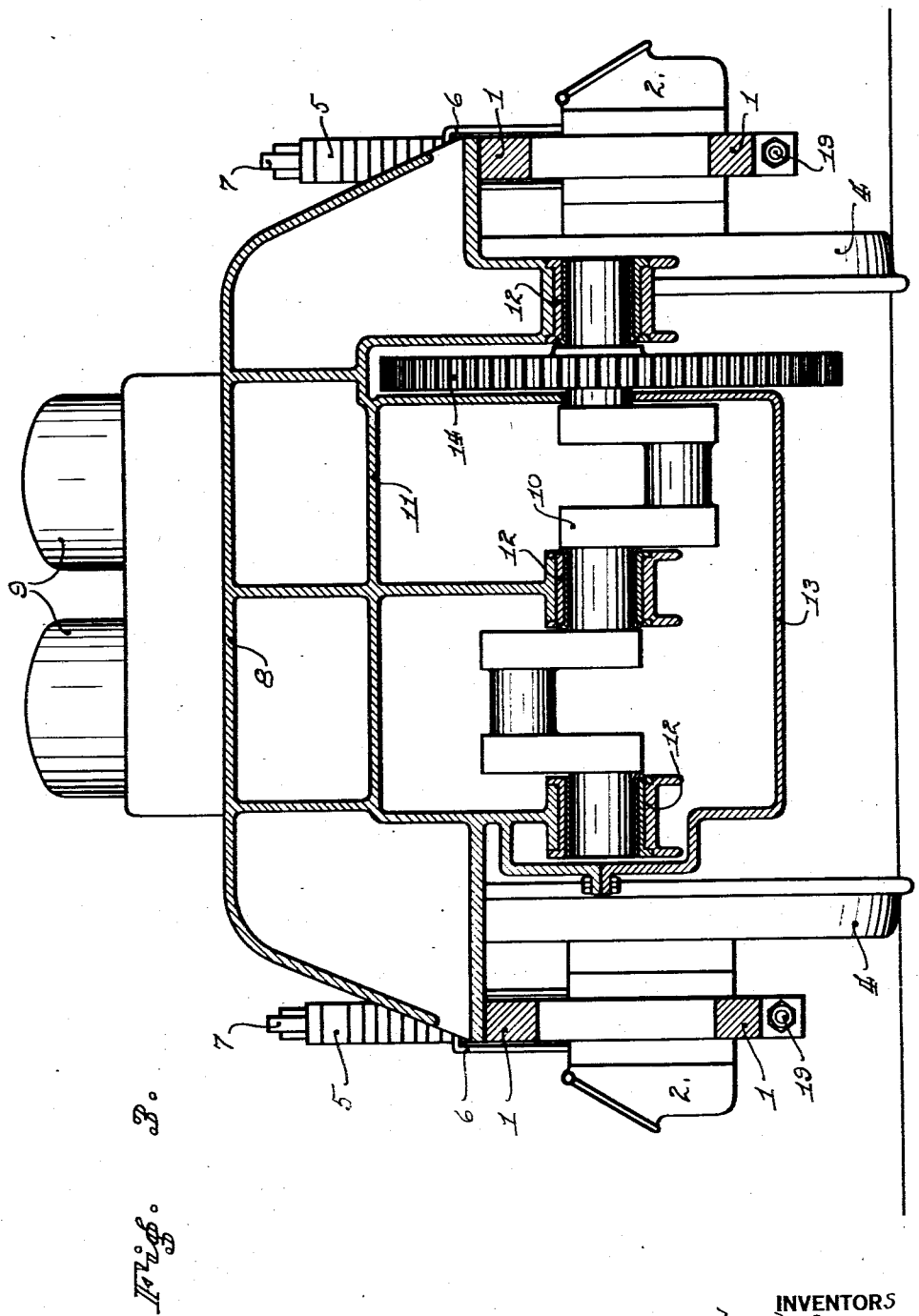
Fig. 3 is a transverse section taken on the line 3—3 of Fig. 1.

Each crankshaft 10 has fixed upon it, near one end, a gear 14, Figs. 1 and 2, which meshes with gears 15 mounted about the axles 3. The engines are so positioned, as shown, that their crank shafts 10 are parallel to and equi-distant from the two adjacent axles 3, so that each crankshaft gear 14 meshes with two axle gears 15, and each axle gear 15 meshes with the crank-shaft gears 14 of two engines. Thus the entire series of gears 14 and 15, (there being four engines and three axles shown in the drawings, having four gears 14 and three gears 15, making seven gears in all) form a continuous train, interconnecting all the engines and all the axle gears of the truck in unbroken sequence. All the engines therefore operate in timed relation, and, by properly timing the power impulses of the various cylinders, a practically continuous and smooth flow of power can be obtained. For example, when four four-cylinder engines are used, as shown, the effect is that of a single sixteen-cylinder engine, with all pistons operating on a single crank shaft. The fly wheel effect necessary for such a combination of engines is relatively small, and can be supplied by the gears 14 and 15 without any additional weight.

Figure 4:
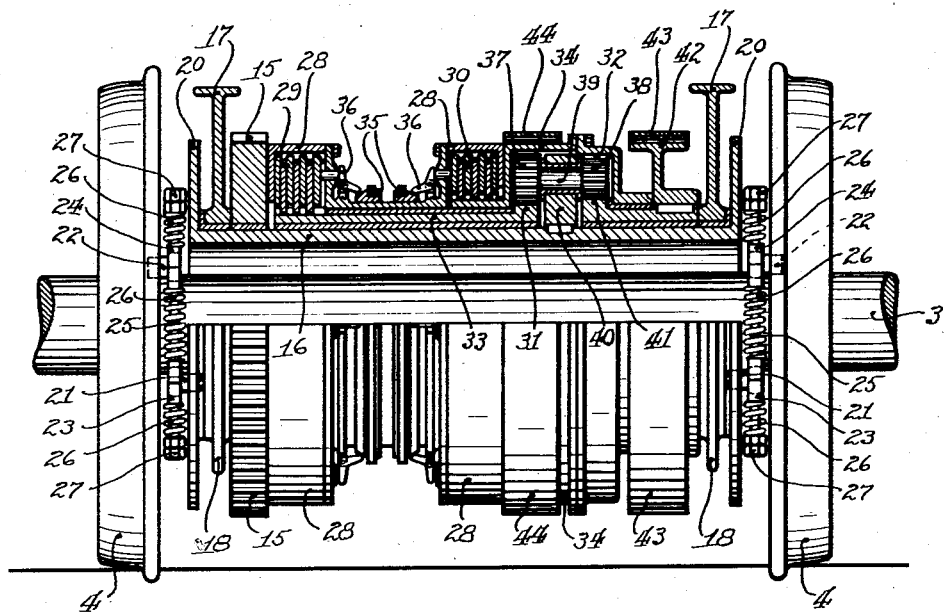
Fig. 4 is a part sectional elevation of one of the axles and a preferred form of variable speed transmission mechanism associated therewith, the sectional portion of the figure being taken on the line 4—4 of Fig. 1.

The gears 15 are not mounted directly upon the axles 3, but are rotatably carried upon sleeves or quills 16, Figs. 1 and 4, spaced about said axles. Said sleeves or quills are journaled in brackets 17 secured to and extending between the engine crank-cases 11, and such journals are preferably formed with lower removable caps 18, thus permitting the quills to be dropped from below to facilitate maintenance. The axle journal boxes 2 can also be dropped by the removal of the cellar bolts 19, Figs. 1 and 3, so that, by the removal of said cellar bolts and the bearing caps 18, the entire axle and quill assembly, with its associated mechanism, which will be described presently, can be removed for replacement or repair.

The clearance between the axle 3, and the surrounding quill 16 is sufficient to allow for the movement of the journal boxes 2 in the frame members 1, the quill being carried by the rigid spring-borne structure of the truck as described. The driving connection between the quill and the axle may be of any suitable form well known in the construction of quill drives, but we have shown a specific form of such connection which we prefer to employ. Each end of the quill 16 is provided with a flange 20, Figs. 1 and 4, from which project outwardly one or more ball members 21, (three such members are shown secured to each flange). A corresponding number of similar ball members 22 are secured to and project inwardly from the wheel 4, the ball members 21 and 22 lying approximately in the same vertical plane. Said ball members are respectively gripped by socket members 23 and 24, which are connected together by rods 25 and springs 26, said rods passing freely through said socket members, and the springs being positioned on both sides of both socket members 23 and 24, as shown. By means of nuts 27 on the ends of the rods 25, the springs 26 can be drawn up to any desired initial compression. This arrangement provides a universally flexible driving connection between the quill 16 and the axle 3, and also absorbs any angular inequalities caused by sudden vertical movement of the wheel as when passing over a bad rail joint or other track imperfection, and on account of the initial and normal compression placed on the springs 26 by the nuts 27, chattering, under conditions of wheel slip or otherwise, is reduced to a minimum.

The driving connection between the gear 15 and the quill 16 may be of any suitable type, and depends largely on the form of motive power used and the conditions of service for which the truck is designed. For example, some form of variable speed transmission mechanism is essential for most conditions of service, and in such cases, any suitable variable speed mechanism may be used, but we prefer to employ a device embodying the principles set forth in our co-pending application for multiple speed planetary gear transmission mechanisms, Serial No. 716,559, filed May 29th, 1924. A preferred form of such a device is shown in Fig. 4 of the drawings, and will be described herein only to the extent necessary to a full understanding of our present invention.

The gear 15, Fig. 4, which is journaled upon the quill 16, is fixed to a drum or housing 28, in which are carried two clutches 29 and 30 for respectively connecting said housing with an external gear or sun pinion 31, and an internal gear 32, the former being carried by a sleeve 33, and the latter by a drum 34. Said clutches may be operated by any suitable mechanism, as for example sliding collars 35 and dogs 36. The gears 31 and 32 are connected by a planet pinion member comprising pinions 37 and 38 meshing respectively with said gears 31 and 32 and fixed upon the ends of a short shaft 39 journaled in a spider 40 secured upon the quill 16. A second sun pinion 41 meshes with the planet pinion 38, and is secured to a drum 42, which may be held stationary by a brake band 43. The internal gear 32 may also be held stationary by a brake band 44 acting upon its drum 34. By means of the clutches 29 and 30 and the brakes 43 and 44, either of the sun pinion 31 or the internal gear 32, or both, may be connected with the driving gear 15, and either the internal gear 32 or the sun pinion 41 may be held stationary. When both clutches 29 and 30 are engaged, the entire device rotates as a unit, connecting the quill 16 to the gear 15 with a one-to-one ratio. When the clutch 29 is engaged and the internal gear 32 is held stationary, the spider 40 and quill 16 rotate in the same direction and at a lower speed than the driving gear 15; when the clutch 30 is engaged and the sun pinion 41 is held stationary the spider 40 and quill 16 rotate in the same direction but at a less reduced speed; and when the clutch 29 is engaged and the sun pinion 41 is held stationary, a reverse rotation at reduced speed is obtained. No power is transmitted when both clutches are disengaged. Thus we are able to secure four different gear or speed ratios, one of which is a reverse, between the driving gear 15 and the quill 16.

Each axle and quill assembly carries a similar variable speed transmission mechanism, there being three such mechanisms in the truck shown in the drawings. Any suitable means, not shown, may be employed for operating the various clutches and brakes of such mechanisms. Under all ordinary conditions, of course, the three transmission mechanisms should be operated simultaneously, so that the tractive effort is evenly distributed between the three pair of wheels, and when this is done, the wheels are all interconnected, to rotate in unison, so that one pair of wheels cannot slip in advance of the others; and this interconnection, moreover, is obtained without the employment of side rods, so that the rotating parts can be perfectly balanced, to eliminate any destructive pounding on the rails. Attention is also called to the fact that the same parts, viz:— the gears 14 and 15, not only connect the engines, or other power driving members, with the driving axles, but also serve to interconnect the several driving members and the several axles.

We claim:—

1. A driving mechanism for locomotives and other vehicles comprising an axle; a vehicle propelling wheel mounted thereon; a power driving member; and a driving connection between said power member and said wheel, said connection including a variable speed planetary-gear mechanism mounted about said axle and a resilient power transmitting member.

2. A drive mechanism for locomotives and other vehicles comprising a plurality of vehicle-propelling driven members; a plurality of power driving members individually alternating in position with the propelling driven members; and gears connecting said driven members and said driving members in unbroken sequence.

3. A drive mechanism for locomotives and other vehicles comprising a plurality of vehicle-propelling axles; a plurality of engines individually alternating in position with said axle; gears associated with said engines; and gears associated with said axles, said engine gears and said axle gears meshing in unbroken sequence.

4. A drive mechaism for locomotives and other vehicles comprising a plurality of vehicle-supporting and propelling wheels; a plurality of power driving members individually alternating in position with said wheels; and a train of gears for connecting said wheels and said driving members in unbroken sequence, the alternate gears of said train being connected respectively with said wheels and said driving members.

5. A drive mechanism for locomotives and other vehicles comprising a plurality of individually alternately disposed substantially parallel driving shafts and axles; gears carried upon said shafts and axles, said gears intermeshing to form a continuous train; wheels mounted upon said axles; and power driving members associated with said shafts.

6. A drive mechanism for locomotives and other vehicles comprising an axle; a vehicle propelling wheel mounted thereon; a pair of power driving members, one positioned on each side of said axle; and a variable-speed power-transmitting mechanism mounted about said axle for connecting said power driving members therewith.

7. A drive mechanism for locomotives and other vehicle comprising a frame; a plurality of tubular driven members rotatably mounted therein; a plurality of power driving members carried by said frame and individually alternating in position with said tubular members; power-transmitting mechanism connecting said tubular members and said driving members in unbroken sequence; an axle positioned within each tubular member; flexible weight-supporting connections between said axles and said frame; wheels mounted upon said axles, and flexible power-transmitting connections between said tubular members and said wheels.

8. A drive mechanism for locomotives and other vehicles comprising a frame; a plurality of individually alternately disposed power driving members and tubular driven members mounted in said frame; gears carried upon said members; said gears intermeshing to form a continuous train; axles positioned within said tubular members; flexible weight-supporting connections between said axles and said frame; wheels mounted upon said axles; and flexible power-transmitting connections between said tubular members and said wheels.

9. A drive mechanism for locomotives and other vehicles comprising a plurality of vehicle-propelling driven members; a variable-speed power-transmitting mechanism associated with each of said members; a plurality of power driving members individually alternating in position with the propelling driven members; and means for operatively connecting said variable-speed power-transmitting mechanisms and said power driving members in unbroken sequence.

10. A drive mechanism for locomotives and other vehicles comprising a plurality of axles; propelling wheels mounted on said axles; a variable-speed power-transmitting mechanism associated with each axle; a plurality of power driving members; and means for connecting said variable-speed power-transmitting mechanisms and said power driving members for simultaneous operation in timed relation.

11. A drive mechanism for locomotives and other vehicles comprising a frame; a power driving member carried thereby; a tubular driven member rotatively mounted in said frame; a variable-speed power-transmitting mechanism connecting said driving member with said tubular member; an axle within said tubular member; a flexible weight-supporting connection between said axle and said frame; a wheel mounted on said axle; and a flexible power-transmitting connection between said tubular member and said wheel.

12. A drive mechanism for locomotives and other vehicles comprising a power member having a rotatable driving shaft; a rotatable tubular driven member supported by said power member; a variable-speed power-transmitting mechanism connecting said driving shaft with said tubular member; an axle within said tubular member; a flexible weight-supporting connection between said axle and said power member; a wheel mounted upon said axle; and a flexible power-transmitting connection between said tubular member and said wheel.

13. A drive mechanism for locomotives and other vehicles comprising a power member having a rotatable driving shaft; a rotatable tubular member supported by said power member; a gear rotatably mounted upon said tubular member and driven by said shaft; means for connecting said gear with said tubular member at will; an axle within said tubular member; a flexible weight-supporting connection between said axle and said power member; a wheel mounted upon said axle; and a flexible power-transmitting connection between said tubular member and said wheel.

14. A drive mechanism for locomotives and other vehicles comprising a frame, a power driving member carried thereby; a rotatable tubular member supported thereby; means for connecting said tubular member with said power driving member at will; an axle within said tubular member; a flexible weight-supporting connection between said axle and said frame; a wheel mounted upon said axle; and a flexible power-transmitting connection between said tubular member and said wheel.

15. A drive mechanism for locomotives and other vehicles comprising a plurality of power driving members, each having a rotatable shaft, said shafts being permanently interconnected for simultaneous operation in timed relation; a plurality of vehicle propelling wheels; and means for connecting said wheels in driving relation with the interconnected power shafts at will.

16. A drive mechanism for locomotives and other vehicles comprising a plurality of power driving members, each having a rotatable shaft, said shaft being permanently interconnected for simultaneous operation in timed relation; a plurality of axles; vehicle propelling wheels carried by said axles; and means associated with each axle for connecting it in driving relation with the interconnected power shafts at will.

17. A drive mechanism for locomotives and other vehicles comprising a plurality of power driving members, said members being permanently interconnected for simultaneous operation in timed relation, a plurality of axles; vehicle propelling wheels carried by said axles; and a planetary-gear power-transmitting mechanism mounted about each axle for connecting it in driving relation with the interconnected power members.

18. A drive mechanism for locomotives and other vehicles comprising a plurality of power driving members, said members being permanently interconnected for simultaneous operation in timed relation; an axle; a propelling wheel carried by said axle; and a planetary-gear power-transmitting mechanism mounted about said axle for connecting it in driving relation with the interconnected power members.

19. A drive mechanism for locomotives and other vehicles comprising a power driving member; a rotatable tubular member supported thereby; a planetary-gear power-transmitting mechanism mounted about said tubular member for connecting it in driving relation with said power member; an axle within said tubular member; a wheel mounted upon said axle; and a flexible power-transmitting connection between said tubular member and said wheel.

20. A drive mechanism for locomotives and other vehicles comprising a power driving member; a rotatable tubular member supported thereby; means for connecting said tubular member at will in driving relation with said power member; an axle within said tubular member, a wheel carried by said axle; a flange carried by said tubular member, said flange being substantially parallel to said wheel; and a flexible power-transmitting connection between said flange and said wheel.

21. A drive mechanism for locomotives and other vehicles comprising a power driving member having a rotatable shaft; a plurality of axles; vehicle propelling wheels carried by said axles; and a variable speed planetary gear power transmitting mechanism mounted about each axle for connecting in driving relation with the shaft of said power member.

22. A drive mechanism for locomotives and other vehicles comprising parallel side frame members; a plurality of transversely disposed power driving members supported by and extending between said frame members; a plurality of vehicle-propelling driven members rotatably carried by said power members and individually alternating in position therewith; and power-transmitting mechanism connecting said power members and said driven members in unbroken sequence.

23. A drive mechanism for locomotives and other vehicles comprising parallel side frame members; a plurality of transversely disposed power driving members supported by and extending between said frame members; brackets extending between said power members; vehicle propelling driven members rotatably mounted in said brackets; and power-transmitting mechanism connecting said power members and said driven members in unbroken sequence.

24. A drive mechanism for locomotives and other vehicles comprising parallel side frame members; a plurality of transversely disposed power driving members supported by and extending between said frame members; brackets extending between said power members; tubular driven members rotatably mounted in said brackets; power-transmitting mechanism connecting said power members and said tubular members in unbroken sequence; an axle within each tubular member; weight-supporting connections between said axles and the frame members; and power-transmitting connections between said tubular members and said axles.

25. A drive mechanism for locomotives and other vehicles comprising parallel side frame members; cross members extending between said side members; a power driving member rigidly suspended from each cross member; vehicle-propelling members rotatably supported between said power members; and resilient power-transmitting connections between said power members and said driven members.

In testimony whereof we have signed our names to this specification.

FRED F. SMALL.
CARL E. NAGEL.